May 22, 1951
H. M. STEPHENSON ET AL
2,554,221
MAGNETICALLY ACTUATED ROLLER CLUTCH
Filed Feb. 25, 1950
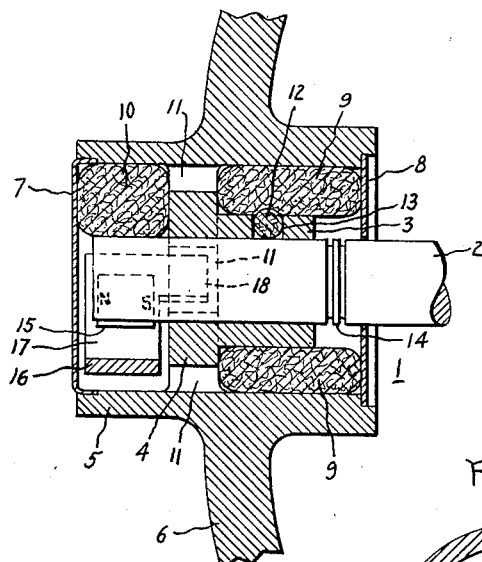
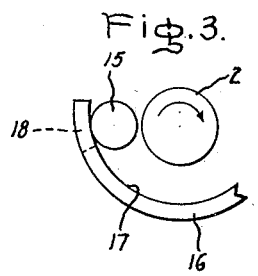
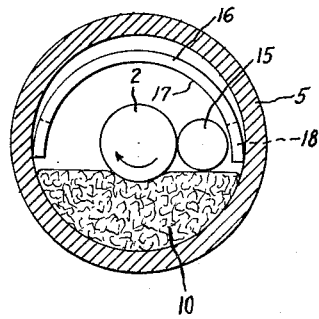
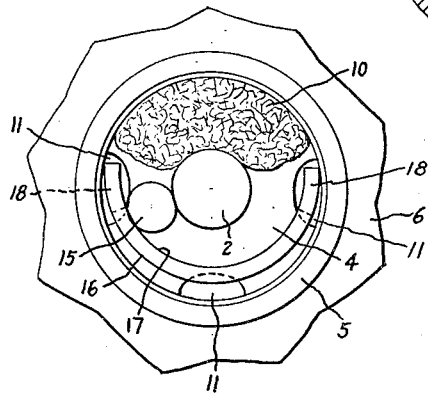
Inventors:
Hugh M. Stephenson,
Wyval M. Rowan,
by Ernest E. Britton
Their Attorney.

Patented May 22, 1951

2,554,221

UNITED STATES PATENT OFFICE 2,554,221

MAGNETICALLY ACTUATED ROLLER CLUTCH

Hugh M. Stephenson and Wyval M. Rowan, Fort Wayne, Ind., assignors to General Electric Company, a corporation of New York Application February 25, 1950, Serial No. 146,362

2 Claims. (Cl. 192—44)

This invention relates to one-way clutches and more particularly to clutches which automatically limit relative rotational movement in one direction while allowing free movement in the opposite direction.

In a known structure for one-way clutches, a roller is in contact with a rotating shaft or with a wheel which is integral with the shaft. The roller is held within a wedge-shaped opening between the shaft and housing which surrounds the shaft. If the shaft is rotated in one direction, the roller is moved toward the open or enlarged portion of the wedge-shaped space and there is no mechanical interference by the roller with continued rotation of the shaft. If the shaft is rotated in the opposite direction, the roller is forced into the restricted section of the wedge-shaped space, where the roller becomes firmly wedged between the shaft and the housing to prevent further movement of the shaft relative to the housing. The above described structures generally operate satisfactorily; however, the roller is subject to considerable wear under usual operating conditions when the clutch is disengaged since the roller must be continuously in contact with both the shaft and the housing in order to assure immediate performance of the clutch. Also, a spring is quite generally required in order to position the roller positively in the entrance of the wedge-shaped space for firm contact between both the shaft and the housing to assure positive clutch action.

It is, therefore, an object of this invention to provide an improved one-way clutch employing a roller in a wedge-shaped space in which the roller is not required to be in contact with both the rotating shaft and the housing when the clutch is disengaged and which does not require a spring means for the purpose of causing clutch engagement, while nevertheless providing positive clutch action.

This improved clutch, therefore, consists generally in a wedge type roller clutch including a roller which is permanently magnetized.

The novel aspects of this invention are pointed out with particularity in the appended claims, and for a more complete understanding of the invention, reference should be had to the following specification and the accompanying drawing wherein Fig. 1 is a side view, partially in section, of a journal bearing for a rotatable shaft and incorporating the clutch of this invention. Fig. 2 is an end view of the structure of Fig. 1 showing the clutch structure in more detail with the end cover removed. Fig. 3 is a partial detail view showing the position of the roller relative to the shaft when the shaft is rotating freely, and Fig. 4 is a similar view of a second embodiment of this invention.

Referring more particularly to the drawing, in Fig. 1 there is shown a sleeve bearing structure, designated as a whole as 1, for the support of a rotatable shaft 2. Bearing 1 includes a bearing sleeve 3 supported at a section 4 within a housing comprised of a hub section 5 of a flange 6 which may be the end flange of a small electric motor in which it is desired to have one direction of rotation only. The ends of hub 5 are closed by cover plates 7 and 8, and the spaces thus enclosed, surrounding bearing sleeve 3, are used as a lubricant reservoir with lubricant retainers 9 and 10 of a material such as cotton wicking. Openings 11 are provided in section 4 to allow passage of the lubricant from one side of the section to the other. A small piece of wicking 12 is positioned in an opening at 13 in bearing sleeve 3 to convey the lubricant from retainer 9 onto the lubricated surface of shaft 2. An oil slinger flange 14 is provided on shaft 2 to prevent the lubricant from traveling axially along the shaft and out of the oil retaining enclosure.

In the space to the left of section 4 in Fig. 1 are the components which comprise a wedge type one-way clutch including a roller 15 and a roller housing member 16. Fig. 2 is a view of the left end of the structure of Fig. 1 with cover plate 7 removed for a better showing of the clutch components. The interior surface 17 of housing member 16 is of a curved shape, having a center of curvature slightly above the center of shaft 2 so that the lowermost portion of this surface is more closely spaced to shaft 2 than are the uppermost portions. The diameter of roller 15 is intermediate the dimensions of these spacings so as to wedge between the shaft and the inner housing surface intermediate the uppermost portion and the lowermost portion of surface 17. This wedging action is positive for attempted counterclockwise rotation of shaft 2 but is releasable upon clockwise rotation of shaft 2. Reverse operation of the clutch may be obtained by assembling roller 15 on the right side of the shaft 2 instead of on the left side as shown. Roller 15 is shown as in the locked position. Housing member 16 is retained in the position shown by means of integral tabs 18 which extend axially into two of the oil passage openings 11. Lubricant retainer 10 also serves as a retainer for roller 15 to prevent the roller from leaving the space between housing member 16 and shaft 2.

Roller 15 is of a magnetic material having a high magnetic retentivity such as a magnetic alloy of aluminum, nickel and cobalt, and is permanently magnetized in an axial direction. Both shaft 2 and housing member 16 are also of magnetic material. The resulting mutual attraction between roller 15 and shaft 2 and between roller 15 and housing member 16 assures a positive locking action of the clutch for the counterclockwise direction of shaft rotation.

Because of the mutual magnetic attraction between roller 15 and shaft 2, roller 15 is attracted upwardly by the rotating surface of shaft 2 when shaft 2 is rotating in the clockwise direction. The resulting positioning of the parts involved is shown in Fig. 3. Roller 15 is also attracted to housing member 16, and since housing member 16 displays a concave surface to roller 15 as contrasted to the convex surface presented by shaft 2, the attraction to member 16 is greater and roller 15 is thereby retained in an elevated position against housing member 16 and slightly spaced from rotating shaft 2. When clockwise rotation of shaft 2 ceases, roller 15 again descends to the position shown in Fig. 2 by the magnetic attraction between roller 15 and shaft 2.

Fig. 4 is a view, corresponding to Fig. 3, of a second embodiment of this invention wherein housing member 16 is of a non-magnetic material and therefore exercises no magnetic force on magnetic roller 15. In other respects, this structure corresponds closely to the first embodiment shown in Figs. 1, 2 and 3 except that the clutch parts 10, 15 and 16 are assembled in the reverse or "upside down" positions. In this embodiment, roller 15 is continuously attracted to shaft 2 and, in the clutch-disengaged position shown, rotates in response to rotation of shaft 2 against retainer 10. Retainer 10, in this embodiment, therefore serves a more active roller retaining function and may preferably be made of a more rigid material having greater structural strength than wicking, such as cotton felt. In this embodiment, therefore, roller 15, when in the disengaged position, frictionally contacts with only one of the members, the shaft, against which wedging generally occurs when the clutch becomes locked. Frictional wear is thereby also alleviated in this second embodiment. When counterclockwise rotation of shaft 2 is attempted, roller 15 follows the surface of the shaft upwardly into the locked position to thereby prevent more than a very small angle of rotation.

It will be seen from the above description that the invention disclosed provides an improved one-way clutch which involves a simple, economical construction, subject to less mechanical wear than corresponding prior structures.

Accordingly, while we have described and illustrated a preferred embodiment of our invention, we wish it to be understood that we do not intend to be restricted solely thereto but that we intend to cover all modifications thereof which would be apparent to one skilled in the art and which come within the spirit and scope of our invention.

What we claim as new and desire to secure by Letters Patent of the United States is:

1. A one-way clutch comprising a housing member of magnetic material, a shaft member of magnetic material rotatable therein and a permanently magnetized cylindrical roller of magnetic material arranged therebetween, said housing including an interior surface radially variably spaced from said shaft by a dimension which exceeds the diameter of said roller at one portion of said surface and falls short of the diameter of said roller at another portion of said surface whereby said roller is adapted to be wedged between said shaft and said surface for a first direction of rotation of said shaft to prevent rotation in said direction, said roller being adapted to follow said shaft into said wedging relationship under the force of mutual magnetic attraction therebetween, said roller being further adapted to follow said shaft out of said wedging relationship under the force of said mutual magnetic attraction to allow said shaft to run free in a second direction of rotation, said roller being adapted for positioning against said surface of said housing under the force of mutual magnetic attraction therebetween, said attraction between said roller and said surface exceeding said attraction between said roller and said shaft whereby said roller is positioned against said surface and slightly separated from said shaft to thereby prevent friction and wear between said roller and said shaft during rotation in said second direction.

2. In combination, a journal bearing, a shaft of magnetic material rotatably supported therein, a one-way clutch comprising a housing member of magnetic material positioned around said shaft at said bearing and a permanently axially magnetized cylindrical roller of magnetic material arranged between said housing and said shaft, said housing including an interior surface radially variably spaced from said shaft by a dimension which exceeds the diameter of said roller at one portion of said surface and falls short of the diameter of said roller at another portion of said surface whereby said roller is adapted to be wedged between said shaft and said surface for a first direction of rotation of said shaft to prevent rotation in said direction, said roller being adapted to follow said shaft into said wedging relationship under the force of mutual magnetic attraction therebetween, said roller being further adapted to follow said shaft out of said wedging relationship under the force of said mutual magnetic attraction to allow said shaft to run free in a second direction of rotation, said roller being adapted for positioning against said surface of said housing under the force of mutual magnetic attraction therebetween, said attraction between said roller and said surface exceeding said attraction between said roller and said shaft whereby said roller is positioned against said surface and slightly separated from said shaft to thereby prevent friction and wear between said roller and said shaft during rotation in said second direction.

HUGH M. STEPHENSON.
WYVAL M. ROWAN.

REFERENCES CITED

The following references are of record in the file of this patent:

UNITED STATES PATENTS

| Number | Name | Date |
|---|---|---|
| 2,300,223 | Hottenroth, Jr. | Oct. 27, 1942 |
| 2,410,818 | Grant, Jr. | Nov. 12, 1946 |